Nov. 13, 1951 J. F. CLARK, III 2,574,690

AMPLIFIER-RECTIFIER CIRCUIT

Filed March 12, 1947 2 SHEETS—SHEET 1

Inventor
John F. Clark, III

By Orl R. Goshaw

Attorney

Nov. 13, 1951 J. F. CLARK, III 2,574,690

AMPLIFIER-RECTIFIER CIRCUIT

Filed March 12, 1947 2 SHEETS—SHEET 2

John F. Clark, III
Inventor

By Val R. Goslaw

Attorney

Patented Nov. 13, 1951

2,574,690

UNITED STATES PATENT OFFICE 2,574,690

AMPLIFIER-RECTIFIER CIRCUIT

John F. Clark, III, Burbank, Calif., assignor to Radio Corporation of America, a corporation of Delaware Application March 12, 1947, Serial No. 734,131

4 Claims. (Cl. 250—27)

This invention relates to amplifier-rectifier circuits and particularly to a circuit for obtaining a direct current closely corresponding to the variations in the peak amplitudes of an alternating current signal.

In the art of motion picture production, it is well known that noise reduction is employed. Noise reduction in variable area types of sound recording systems consists in opaquing the portion of the sound track area of the final print not occupied by modulations, while noise reduction in variable density systems consists in an average darkening of the sound track area in accordance with the amplitude of the signal recorded. To accomplish these results in an amplifier-rectifier circuit, the output thereof should very closely follow the peak variations of the signal. Furthermore, in variable area types of sound recording systems, the output of the noise reduction amplifier may actuate shutter vanes to eliminate the recording light beam from the portions of the negative sound track area not being used by the signal modulations, or the noise reduction amplifier may feed a bias winding on a modulating galvanometer to control the average position of the galvanometer according to the signal amplitude at any particular instant. In each case, however, it is particularly desirable that the noise reduction or amplifier-rectifier circuit have good peak reading ability. The circuit should also be stable, simple and economical in construction.

To provide the above characteristics, the alternating current amplifier driving the audio-rectifier system should have a low impedance output and the time constant of the filter should provide a good pulsed waveform response without excessive values of the grid resistor in the direct current amplifier of the system. The present circuit also permits altering the input-output characteristic by a simple switching arrangement. Switching is desirable since it is preferable to have a linear relationship between input and output for a galvanometer modulator although it may function in a non-linear system, while shutters require a substantially exponential relationship. Thus, the circuit hereinafter described may be used for either biased galvanometer or shutter operation with good peak reading characteristics in each case.

The principal object of the invention, therefore, is to improve the control of the noise reduction action in a sound recording system.

Another object of the invention is to provide an improved system for obtaining noise reduction action in sound recording systems.

A further object of the invention is to provide an improved noise reduction amplifier having good peak reading ability and good pulsed waveform response.

A still further object of the invention is to provide an amplifier-rectifier circuit which has a low supply impedance to the audio-rectifier circuit, and a switching circuit for obtaining either linear or exponential relationship between input and output.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Figure 1:
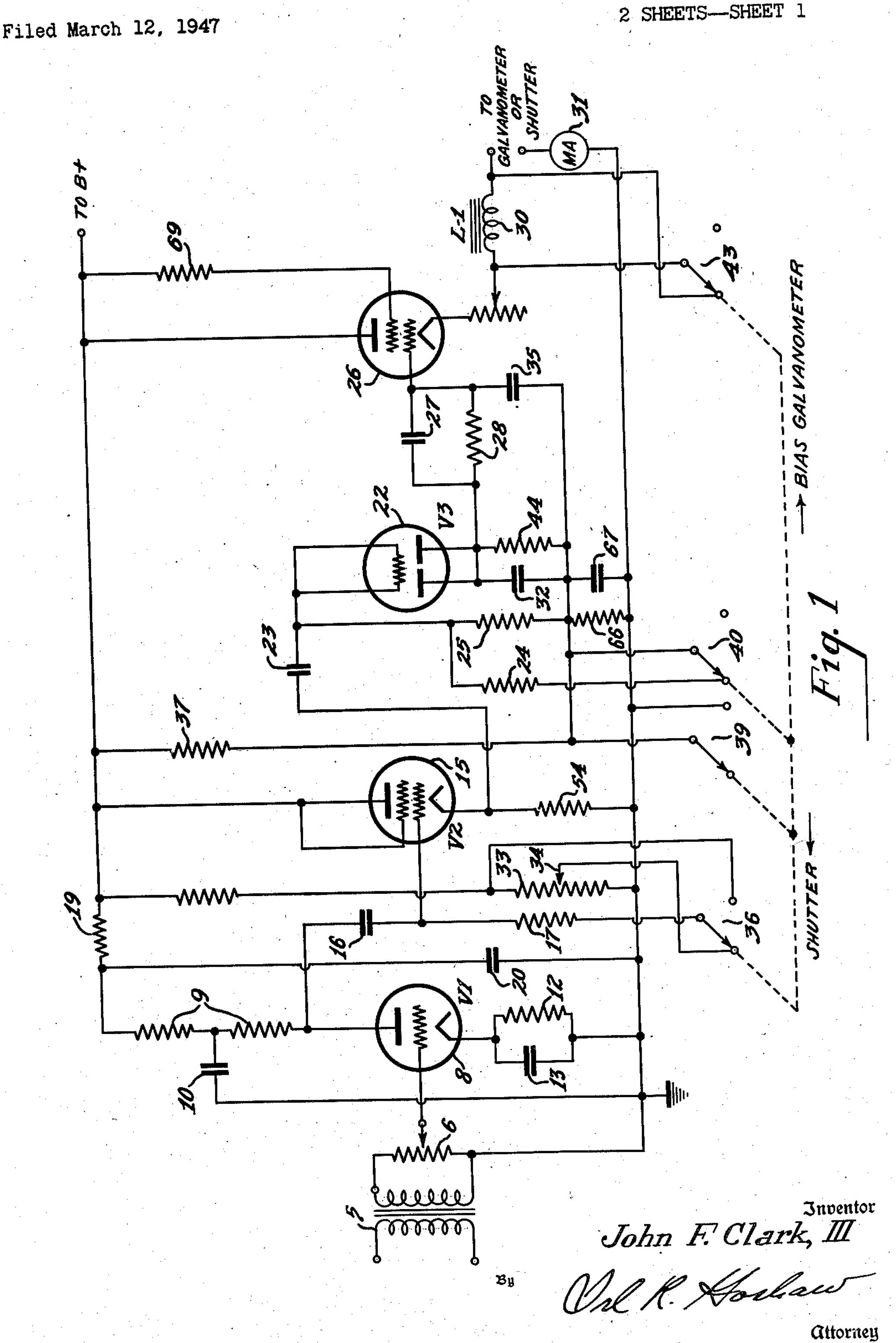
Fig. 1 is a schematic drawing of one modification of the invention.

Referring now to the drawings in which the same numerals refer to identical elements, a signal input transformer 5 is shunted by a potentiometer resistor 6, the slider of which feeds the first alternating current amplifier tube 8. The amplifier tube 8 has the usual load resistors 9, bypass condenser 10, and bias resistor 12 with its bypass condenser 13. The tube 8 is coupled to an alternating current amplifier tube 15 through a coupling condenser 16 and a resistor 17. The usual load resistor 19 and bypass condenser 20 is also provided.

Referring now to Fig. 1, the amplifier tube 15 is coupled to a half-wave rectifier 22 over a condenser-resistor network 23, 24 and 25, the output of the rectifier 22 being connected to a bootstrap direct current amplifier tube 26 over a resistor 28 in the filter network including condensers 32 and 35. Resistor 44 is a load resistor and condenser 27 is a speed-up condenser as disclosed and claimed in copending application, Serial No. 582,137, filed March 10, 1945, now U. S. Patent No. 2,419,001, dated April 15, 1947. The direct current amplifier tube 26 feeds a shutter or bias galvanometer connected in its cathode circuit in series with a decoupling choke 30 and a milliammeter 31.

The conditions for linear input-output characteristics desirable for the bias type of modulating galvanometer are that the amplifier tubes 8 and 15 be operated on a linear portion of their characteristic curves through the range required to produce sufficient bias across the audio-rectifier load resistor 44 so as to cut off the plate current of amplifier tube 26. Linear operation of amplifier tube 8 occurs for any condition of operation. Linear operation of amplifier tube 15 is determined by the potential divider 34 which applies sufficient positive voltage to the grid to produce the correct grid-cathode potential for linear cathode follower output from amplifier tube 15. Resistor 25 is a high resistance and resistor 24 is a comparatively low resistance.

The conditions for non-linear input-output characteristics desirable for the shutter type of noise reduction, are that the amplifier tube 15 has a bias which causes its output to limit off. This bias can be varied by the setting of the slider 34 on resistor 33. Furthermore, the output circuit should be loaded, which can be accomplished by resistor 24. When these conditions obtain the plate current of tube 26 will reduce to a given value slowly, once limiting starts in tube 15, thereby giving the desired results.

Referring again to Fig. 1, a switch 36 is provided for introducing for shutter operation, a portion of the resistor 33 in series with resistor 17 in accordance with the setting of slider 34 which increases the negative bias on tube 15. By switch 39, the resistor 37 may be connected directly to ground for bias galvanometer operation. With the switch 39 in position for shutter operation, a resistor 66 and condenser 67 raises the input grid potential on tube 26 to prevent its going to cut-off and thus insuring a finite current through the shutter at full modulation. A switch 40 connects the load resistor 24 in shunt to leak resistor 25 to load the output of tube 15. Thus tube 15 requires a greater input signal to provide the same input to rectifier 22 which increases the non-linear performance of tube 15. The choke coil 30 may be shorted by a switch 43 for shutter operation but is desired in the circuit for galvanometer operation as a filter for audio leakage frequencies. The broken lines indicate that switches 36, 39, 40 and 43 may be simultaneously operated to change between shutter and biased galvanometer operation. When the switch is thrown to the left the output of tube 26 will be exponential with respect to the input signal at tube 8 which is the desired relationship for shutter operation, and when the switch is thrown to the right, the output will be linear which is desired for biased galvanometer operation.

Figure 2:
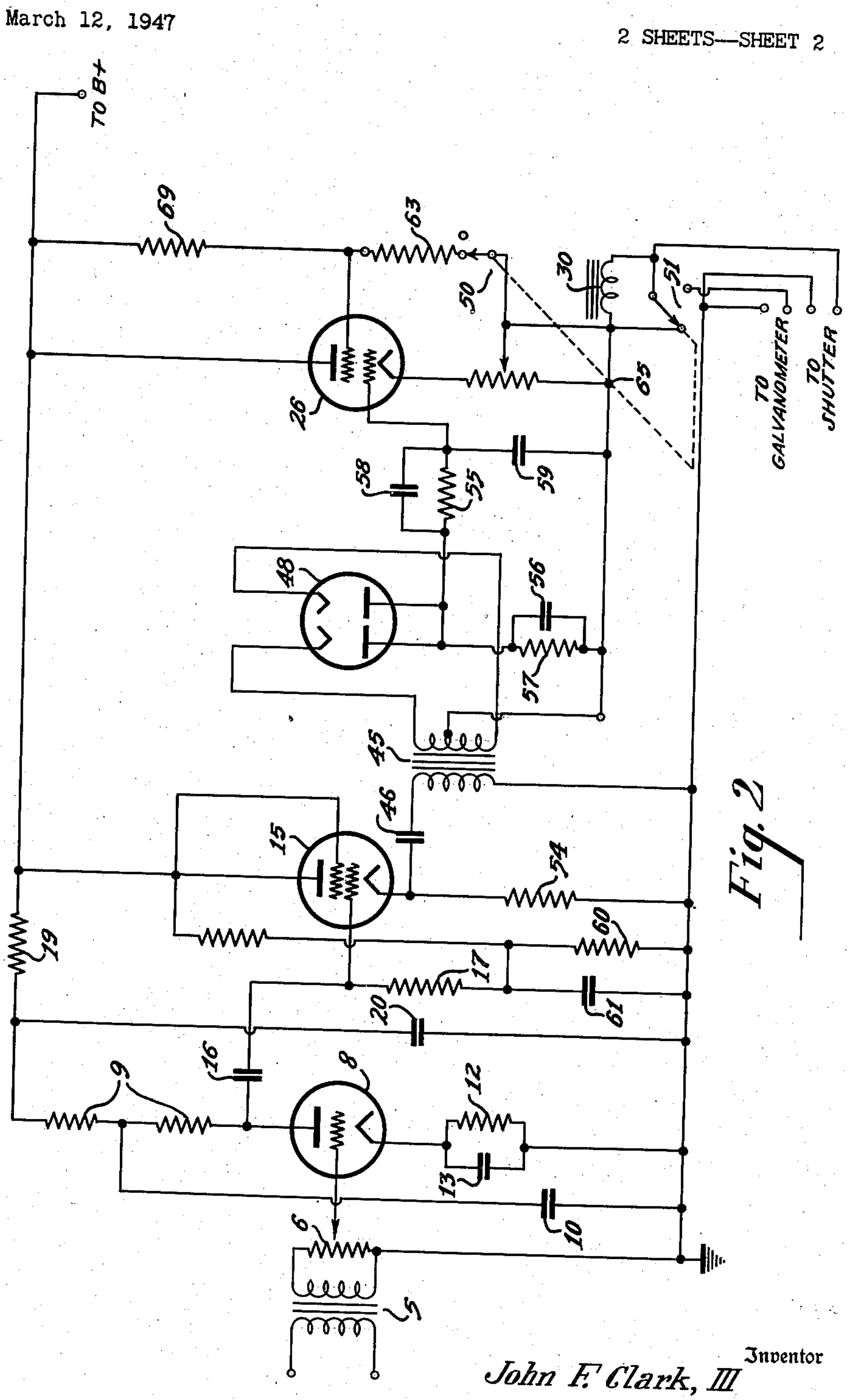
Fig. 2 is a schematic drawing of a full-wave modification of the invention.

Referring now to Fig. 2, the alternating current amplifier portion again consists of tubes 8 and 15 in the same manner as in Fig. 1. In this circuit, however, the amplifier tube 15 feeds a transformer 45 over a condenser 46, the secondary of the transformer being connected to a full-wave rectifier tube 48 which feeds the bootstrap direct current amplifier 26 as in Fig. 1. The interconnecting filter between rectifier 48 and amplifier tube 26 consists of a resistor 55, and condensers 56 and 59 while a diode load resistor 57 and a speed-up condenser 58 are also used as in Fig. 1. In this modification tube 15 is maintained linear at all times by a fixed resistor 60 with its bypass condenser 61. Resistor 54 is the usual bias resistor. Two switches 50 and 51 are now provided to shift from a galvanometer load to a shutter load as in Fig. 1, switch 50 inserting a resistor 63 in the screen grid circuit of tube 26 and switch 51 shorting filter coil 30.

In the circuit of Fig. 2, an improved arrangement is shown for producing the desired non-linear or exponential effect for shutter operation, although some non-linearity is also provided for galvanometer operation. The circuit also provides a high output impedance for matching high impedance galvanometers. It is well known that sharp cut-off tubes, while linear for wide ranges of operation, exhibit non-linear characteristics near the point of plate current cut-off. It therefore becomes necessary to drive tube 26 to cut-off for shutter operation. However, to provide the finite current required for shutter operation, resistor 63 is chosen to cause a current to flow through the shutter from the plus B source over dropping resistor 69 under full signal conditions or when tube 26 is at cut-off. The finite current value should be such that the shutter vane image just clears the recording slit. Therefore, with this circuit, a sufficient amount of non-linearity is derived by properly establishing the direct current potential between point 65 and ground to produce the required value of finite current at maximum signal conditions.

One of the fundamental characteristics of a circuit providing good peak reading qualities is a low impedance input to the rectifier and this is obtained by the use of a cathode follower type of audi-rectifier driving circuit. (Resistor 54.) The circuit of Fig. 2 is preferred since it is a full-wave circuit, it permits both tubes 8 and 15 to operate linearly at all times, and it has a high output impedance. Also, capacity effects of unbalance are reduced to a minimum since longitudinal currents will be neutralized in the push-pull circuit arrangement. The filter elements in each modification such as 28, 32 and 35 in Fig. 1, and 55, 56 and 59 in Fig. 2, provide a rapid acting full-wave response and a low value grid-resistor for tube 26. (Resistors 28 and 55.) Thus, the circuit reacts rapidly to an increase in signals and will closely follow the peaks of the signal variations.

For a practical example, tubes 8 are 6J7s, tubes 15 and 26 are 6V6's, and tubes 22 and 48 are 6H6's. The filter resistors 28 and 55 are 1.5 megohms, condensers 32 and 35 in Fig. 1 and condensers 56 and 59 in Fig. 2 are .08 and .008 mf., respectively, resistors 44 and 57 are 1 megohm and speed-up condensers 27 and 58 are .002 mf. The decoupling chokes 30 are 1.6 henries and resistor 63 is approximately 33,000 ohms. The values of the other circuit elements are those of standard amplifiers.

I claim:

1. A noise reduction amplifier-rectifier circuit comprising a load circuit, an alternating current amplifier, a rectifier connected to the output of said alternating current amplifier, a multigrid direct current bootstrap amplifier connected to the output of said rectifier, a high potential source for said direct current amplifier, and means connected between the screen grid of said direct current amplifier and said load circuit for producing a finite current in the output circuit of said direct current amplifier when said direct current amplifier is driven to cut-off.

2. An amplifier-rectifier circuit in accordance with claim 1, in which said means includes a resistor between said screen grid and said high potential source for said direct current amplifier, and a resistor between said screen grid and said load circuit.

3. An amplifier-rectifier circuit adapted to feed a load requiring an exponential relationship between its alternating current input and its direct current output and providing a finite current during exponential output, comprising a load circuit, an alternating current amplifier having a linear operating characteristic, a rectifier connected to the output of said alternating current amplifier, a direct current bootstrap amplifier having an anode, a cathode, and a plurality of grids connected to the output of said rectifier and to said load circuit, biasing means for said direct current amplifier to permit said direct current amplifier to be driven to cut-off, a high potential source for said amplifier, means connected between said high potential source and the screen grid of said direct current amplifier to polarize said grid at a value less than said anode of said direct current amplifier, and means connected between said screen grid and said load circuit to provide a finite current in said load circuit of said direct current amplifier when said direct current amplifier is driven to cut-off by the polarity on another of said grids.

4. An amplifier-rectifier circuit comprising an alternating current amplifier having a cathode follower output circuit, a rectifier connected to said cathode follower output circuit of said alternating current amplifier, a direct current bootstrap amplifier, a filter interconnecting said rectifier and direct current amplifier, said filter having a rapid response to peak voltages, and an output circuit for said direct current amplifier for feeding different types of noise reduction units, said output circuit including a second filter for eliminating currents of audio frequency when said output circuit is connected to one type of said units, means for short circuiting said second filter when said output circuit is connected to another type of said units, said direct current amplifier having a plurality of grids, said second filter comprising an audio frequency retard coil, and means connected between the screen grid of said direct current amplifier and one of said noise reduction units for feeding a finite direct current to said unit when said coil is short circuited.

JOHN F. CLARK, III.

REFERENCES CITED

The following references are of record in the file of this patent:

UNITED STATES PATENTS

| Number | Name | Date |
|---|---|---|
| 2,147,446 | Koch | Feb. 14, 1939 |
| 2,211,010 | Hallmark | Aug. 13, 1940 |
| 2,269,001 | Blumlein | Jan. 6, 1942 |
| 2,323,762 | George | July 6, 1943 |
| 2,323,966 | Arzt | July 13, 1943 |
| 2,324,797 | Norton | July 20, 1943 |
| 2,325,927 | Wilbur | Aug. 3, 1943 |
| 2,379,897 | Floyd | July 10, 1945 |

OTHER REFERENCES

Radar System Fundamentals, Narships 900017, Buships, Navy Dept., Washington, D. C., 1944, page 110; note M301.

Vacuum Tube Amplifiers, Valley & Wallman, vol. 18, MIT Radiation Laboratory Series, McGraw-Hill, N. Y., 1st ed., p. 713.